United States Patent [19]
Juergensen et al.

[11] Patent Number: 4,568,984
[45] Date of Patent: Feb. 4, 1986

[54] METHOD AND APPARATUS FOR SCANNING MASTERS

[75] Inventors: Heinrich Juergensen, Raisdorf; Thomas Zelenka, Kiel, both of Fed. Rep. of Germany

[73] Assignee: Dr. Ing. Rudolf Hell GmbH, Fed. Rep. of Germany

[21] Appl. No.: 497,509

[22] Filed: May 24, 1983

[30] Foreign Application Priority Data

Jun. 3, 1982 [EP] European Pat. Off. ........ 82104843.6

[51] Int. Cl.$^4$ .............................................. H04N 1/10
[52] U.S. Cl. .................................. 358/293; 358/282; 356/239; 250/574
[58] Field of Search ................ 358/293, 294, 102, 80, 358/290, 282; 356/389–394, 237, 239; 250/574, 563, 572

[56] References Cited

U.S. PATENT DOCUMENTS

| 3,894,178 | 7/1975 | Pugsley | 358/80 |
| 3,931,464 | 1/1976 | Murase | 358/288 |
| 4,005,926 | 2/1977 | Neale et al. | 356/158 |
| 4,133,008 | 1/1979 | Tisue | 358/282 |
| 4,468,120 | 8/1984 | Tanimoto et al. | 356/237 |

FOREIGN PATENT DOCUMENTS 58-62543  4/1983  Japan ................... 250/574

Primary Examiner—Edward L. Coles, Sr.
Attorney, Agent, or Firm—Hill, Van Santen, Steadman & Simpson

[57] ABSTRACT

A novel apparatus and method for point-to-point and line-by-line opto-electronic scanning of masters mounted on a transparent master carrier and wherein simultaneous opaque and transparency scanning is accomplished to generate opaque and transparency scanning signals for each point of the master with one of the scanning signals being the actual image signal and the other scanning signal being a recognition signal for those points of the master where amplitude errors in the image signal occur due to scattered light and/or shadowing. The disruptive amplitude errors are eliminated by combining the recognition signal with the actual image signal to obtain a substantially error-free signal.

20 Claims, 9 Drawing Figures

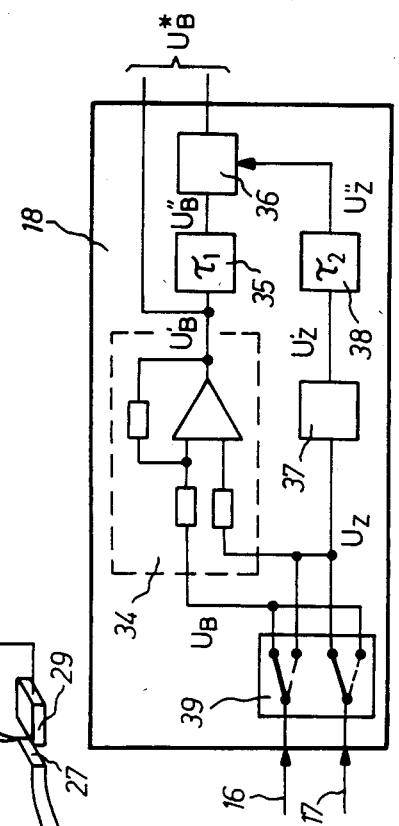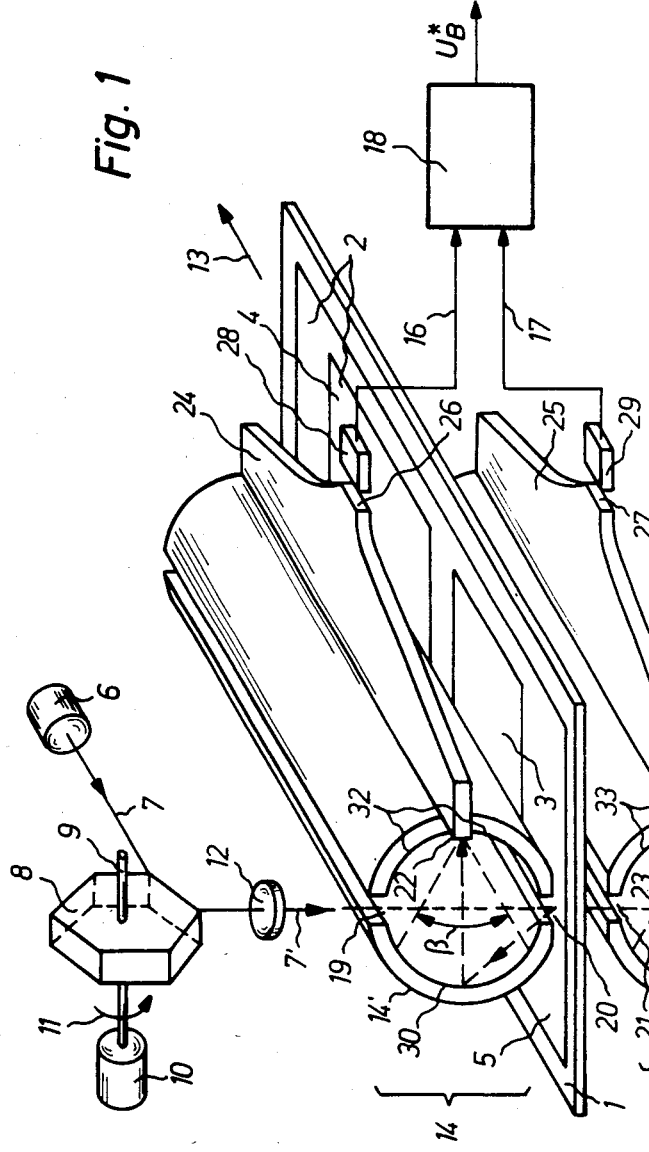
Fig. 1
Fig. 2

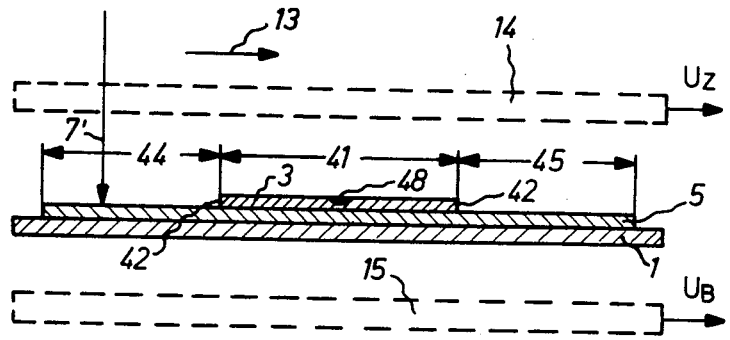
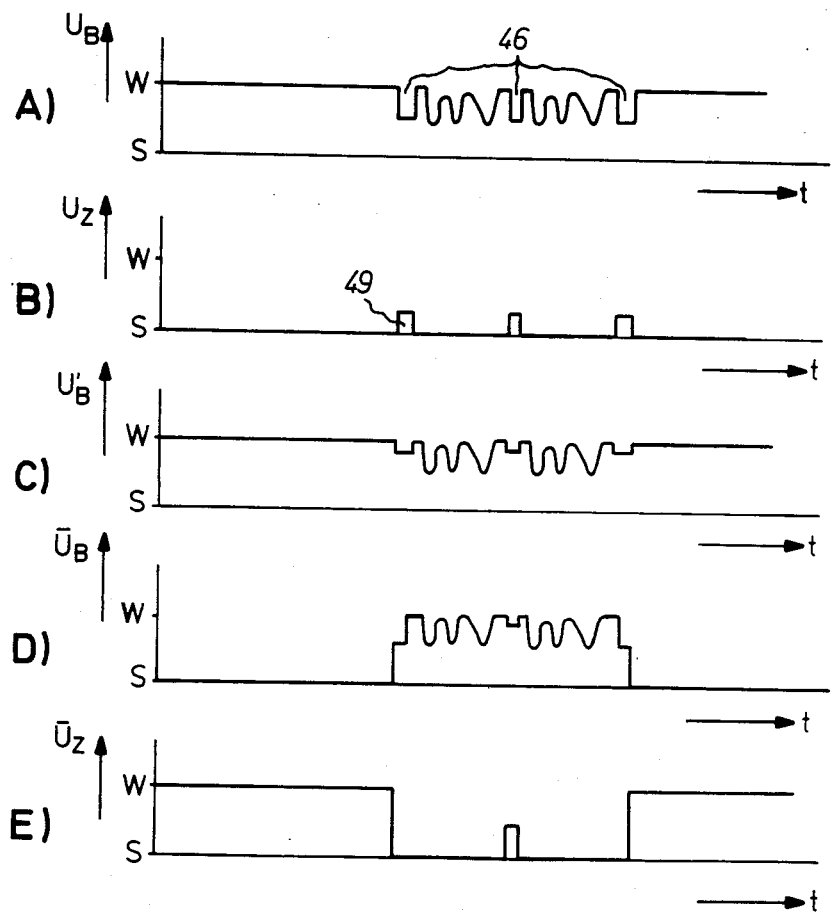
Fig. 4a
Fig. 4b

METHOD AND APPARATUS FOR SCANNING MASTERS

BACKGROUND OF THE INVENTION

1. Field of the Invention

This invention relates in general to method and apparatus for opto-electronically scanning masters which are mounted on a transparent master carrier and can be used for scanning devices for flat bed or drum scanning apparatus.

2. Description of the Prior Art

Flat bed or drum scanning devices are employed in facsimile transmission technology wherein a light beam scans a master to be reproduced by scanning it image point-wise and line-wise. The scanning light from the master impinges on an opto-electronic scanning element and is converted into an image signal. The image signal is sent over a transmission channel to a facsimile recording means in which the reproduction of the master is recorded.

Assembled masters called paste-ups comprise a number of individual masters for lettering and images which are assembled into a full page on a master support. The individual masters can either be opaque masters or transparency masters and the paste-ups are correspondingly scanned by reflection for opaque copy or by transmission for transparencies.

When scanning occurs of montage edges of the individual masters which are referred to as shadow edges and if scratches occur on the masters, the scanning light is diffusedly reflected or respectively transmitted with an asymmetrical intensity distribution which leads to an incorrect measurement given nearly uniform light measurement by the scanning element and, thus, results in an amplitude error in the image signal. Due to such amplitude errors, montage or shadow edges are reproduced when recording the paste-ups as disruptive black edges.

It is known in the prior art to illuminate paste-ups either with two light sources which are disposed to the left and right of the scanning line or to pickup the scanning light with two opto-electrical transducers mounted to the left and right of the scanning line. The amplitude errors can be reduced by this technique but cannot be eliminated.

It is also known to employ scanning elements having light pickup devices which collect the asymmetrical scanning light under a solid angle which is as large as possible and supply it to an opto-electronic transducer. However, the amplitude errors can only be reduced and cannot be entirely eliminated with such light pickup devices.

SUMMARY OF THE INVENTION

So as to avoid the disadvantages of the prior art, it is therefore an object of the present invention to provide a method and apparatus for scanning of opaque or transparencies and in particular paste-ups wherein amplitude errors in the image signal caused by montage edges scratches and etc. can be avoided and eliminated so as to result in a higher reproduction quality than is possible with the prior art. The scanning device and method can be used both for flat bed as well as drum scanning devices.

Another object of the invention provides for point-wise and line-wise opto-electrical scanning of masters mounted on a transparent master carrier and wherein two scanning signals are generated from the same points of the master using simultaneous opaque and transparency scanning whereby one of the scanning signals is the actual image signal $U_B$ of the master and the other scanning signal is a recognition signal $U_Z$ with those points of the masters where amplitude errors occur in the image signal due to scattered light and/or shadowing and the amplitude errors are eliminated by using the recognition signal and combining it with the actual image signal. In one arrangement, the image signal and the recognition signal are added so as to eliminate the amplitude errors.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a perspective view of a sample embodiment of the scanning device for a flat bed scanning means according to the invention;

FIG. 2 is a block diagram illustrating a compensation circuit for correcting amplitude errors:

FIGS. 3b-A-G comprise respectively plots for explaining the invention for opaque scanning;

FIG. 4a is a sectional view through a transparency master for a transparency scanning;

FIGS. 4b-A-E are plots for explaining the invention for transparency scanning;

DESCRIPTION OF THE PREFERRED EMBODIMENTS

Figure 3A:
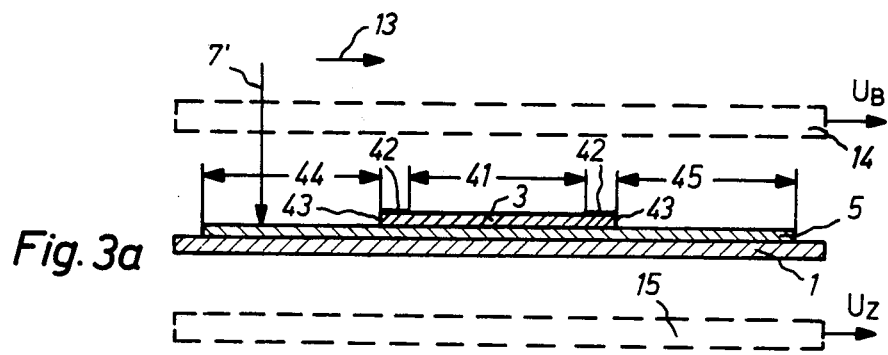
FIG. 3a is a sectional view through an opaque master for opaque scanning.

FIG. 1 illustrates a sample embodiment of the scanning device for paste-ups using a flat bed scanning means according to the invention.

Paste-up 2 comprises a plurality of individual masters such as 3 and 4 for lettering and images which, for example, have been assembled into a full page on a transparent master carrier 5 using hard wax. The master carrier 5 may be a transparent sheet having a high transmissivity but can also be a thin paper having a relatively low transmissivity. Individual masters 3 and 4 can be either opaque masters or transparent masters.

A light source 6 which, for example, might be a laser generates a light beam 7 which impinges on a polyhedral rotating mirror 8. The rotational axis 9 of the polyhedral rotating mirror 8 aligned perpendicularly relative to the optical axis of the light beam 7. A motor 10 drives the polyhedral rotating mirror 8 at a constant angular speed in the direction indicated by arrow 11. As a result of the rotation of the polyhedral rotating mirror 8, the light beam 7 emitted by the light source 6 is reflected by the individual mirror facets and is continuously deflected through a lens 12 onto the paste-up 2 in the line direction 13. In other words, as the mirror 8 rotates, the light beam 7 will be deflected from the left to the right of the paste-up relative to FIG. 1 so as to impinge on a line of the paste-up. Simultaneously, the scanning support 1 is moved step-by-step or continuously with a feed motion at right angles to the line direction 13 so that the paste-up 2 is scanned point-by-point in lines lying next to one another.

A first opto-electronic scanner 14 is mounted on the side of the scanning table adjacent the light source 6 and a second opto-electronic scanner 15 is mounted on the other side of the transparent master support 5. The first scanner 14 picks up the scanning light reflected by the paste-up 2 and generates a first scanning signal which is supplied to an electrical conducting line 16 and the second scanner 15 receives scanning light which passes through the paste-up 2 and transparent support 1 it generates a second scanning signal which is supplied to electrical conducting line 17.

The first and second scanning signals supplied by lines 16 and 17 pass into a compensation circuit 18 so as to correct for amplitude errors in the image signal due to montage or shadow edges as well as due to scratches. The compensation circuit 18 generates a corrected image signal $U^*_B$ which is transmitted to a facsimile recording means not illustrated.

The scanners 14 and 15 may be photo diode strips or arrays which extend over the line length but can also be discrete photo diodes or photo multipliers which are slaved with the light beam in the light direction.

In the sample embodiment illustrated, the scanners 14 and 15 are designed as stationary light pickup devices for instance in the form of hollow cylinders having slit-like openings which extend in the line direction.

The upper light pickup device of the upper scanner 14 has a light entry opening 19 which is formed as a slot in a pair of opposed hemispherical member as well as a slot-shape light passage opening 20 adjacent the scanning table 1 which allows the scanning beam 7' and the reflected scanning light from the master to pass back into the pick-up 14. The light pick-up device 15' of the lower scanner 15 has only a single light entry slot or opening 21 in the cylindrical structure which is adjacent the scanning table 1 so as to allow the scanning light to be picked up after it has passed through the paste-up 2 and the transparent scanning table 1. Both of the light pick-up devices 14' and 15' have light pick-up surfaces 22 and 23 on their internal surfaces which are formed by those surfaces of the optical cross-sectional transducers 24 and 25 which have the greatest dimension. The optical cross-sectional transducers 24 and 25 are constructed of a large number of fiber optical waveguides. The end faces 26 and 27 of the optical cross-sectional transducers 24 and 25 having the smaller dimensions are connected to opto-electronic transducers 28 and 29 respectively which might, for example, be photomultipliers which generate the scanning signals that are supplied to the electrical lines 16 and 17.

The inner surfaces of the light pick-up devices 14' and 15' which are opposite to the light pick-up faces 22 and 23 are designed as diffuse reflectors 30 and 31 which comprise that respective region which is determined by the aperture angle $\beta$ of the fiber optical waveguides of the transducers 24 and 25 as illustrated in FIG. 1.

Unless, light impinging the end faces of the fiber optical waveguides only at the aperture angle $\beta$ is transmitted through the fiber optical waveguides to the opto-electronic transducers 28 and 29.

The remaining inside surfaces of the light pick-up devices 14' and 15' are designed as mirrors 32 and 33 alternatively the entire inner surfaces of the light pick-up devices 14' and 15' can be diffusely reflective surfaces. The shape and spacing of the reflectors 30 and 31 are selected such that as large as possible a component of the light diffusely reflected by them impinges upon the light pick-up faces 22 and 23 within the aperture angle $\beta$. The diffused light coming from the reflectors 30 and 31 which does not directly impinge on the light pick-up faces 22 and 23 is reflected nearly loss free to the reflectors 30 and 31 by the mirrors 32 and 33 and is again diffusely reflected in the direction of the light pick-up faces 22 and 23 where it is detected. The light pick-up face 22 and the opening 20 as was the light pick-up face 23 and the light entry opening 21 are disposed relative to each other such that no scanning light coming directly from the paste-up 2 passes directly to the light pick-up faces 22 or, respectively, 23 but all such light is diffusely reflected at least once by the reflectors 30 and 31. The light entry opening 19 of the light pick-up device 14' is expediently selected to be of a size such that the unmodulated scanning light reflected from a glossy master surface directly re-emerges from the light entry opening 19 and is not picked up.

An employment of light pick-up devices 14' and 15' has the following advantages. Due to the illustrated arrangement of the reflectors 30 and 31 and of the mirrors 32 and 33, a large portion of the scanning light from the paste-up 2 proceeds to the light pick-up faces 22 or, respectively, 23 to the cross-sectional transducers 24 and 25 and to the opto-electronic transducers 28 and 29. The light pick-up devices 14' and 15' thus have a very high efficiency so that the light source 6 which generates the scanning light beam 7 may operate with low power.

Due to the large component of scanning light which passes to the opto-electronic transducers 28 and 29 and due to the diffused reflection at the reflectors 30 and 31, the full aperture angle $\beta$ of the fiber optical waveguides is utilized and the disruptive influence of scratches and shadow edges in the paste-up are reduced. Since the scattered light passing from the reflectors 30 and 31 also propagates in the longitudinal direction of the light pick-up faces 22 and 23, a large number of fiber optical waveguides cooperate to transport light in the opto-electronic transducers 28 and 29 such that unequal transmission properties of the individual fiber optical waveguides is eliminated and a high uniformity of scanning is achieved.

FIG. 2 illustrates a sample embodiment of a compensation circuit 18 according to FIG. 1. The compensation circuit 18 comprises an adder stage 34 which has its output connected to a delay stage 35 which has its output connected to a memory stage 36 which might, for example, be a sample and hold circuit in the signal path of the image signal $U_B'$. A pulse shaping stage 37 has its output connected to a one shot multivibrator 38 in the signal path of the recognition signal $U_Z$ and is generated at those locations of the master at which amplitude errors occur in the image signal $U_B$ due to scattered light and/or shadowings. A change-over switch 39 is connected to the electrical lines 16 and 17 and depending upon the type of scanning whether opaque or transparencies assure that the image signal $U_B$ is supplied to the adder stage 34 and the recognition signal $U_Z$ is supplied to the pulse-shaping stage 37. Attenuators such as resistors might be in the input of the adder stage 34 and in a feedback path as illustrated.

OPERATION DURING OPAQUE SCANNING

When opaque scanning of the paste-up 2 occurs, the change-over switch 39 is placed in the solid line position illustrated in FIG. 2. The upper scanner 14 supplies the actual image information signal and the first scanning signal is the image signal $U_B$ and the lower scanner 15 generates the additional information and second scanning signal which is the recognition signal $U_Z$. The image signal $U_B$ and the recognition signal $U_Z$ are supplied to the adder stage 34 and sum and the modified image signal $U_B'$ obtained at the output of the adder stage 34 is delayed by a time $\tau_1$ in the delay stage 37 and is supplied to the memory stage 36 as image signal $U_B''$. Each signal skip of the recognition signal $U_Z$ is converted in the pulse shaping stage 37 into a trigger pulse $U_Z'$ which triggers the one-shot multivibrator 38. The multivibrator 38 starting with the trigger pulse $U_Z'$ generates a control pulse $U_Z''$ for the memory stage 36 for the duration of the time $\tau_2$. As shall be described, the memory stage 36 suppresses shadow edges as well as maintains the image signal value $U_B''$ occurring at the memory stage 36 at the time the trigger pulse $U_Z'$ occurs for a duration of $\tau_2$ and passes it as a corrected image signal $U_B^*$ even if the image signal value occurring at the memory 36 has changed in the interval.

Assuming that opaque scanning of the paste-up occurs, the additional of the image signal $U_B$ and the recognition signal $U_Z$ is particularly advantageous when the master carrier is transparent. If the master carrier is not transparent, the signal addition is emitted. The compensation circuit 18 operates as illustrated in FIGS. 3a and 3b - A-G when opaque scanning is utilized.

FIG. 3a comprises a sectional view in the direction of line 13 through the transparent scanning support 1 and through the paste-up 2 mounted thereon. In the illustrated example, the transparent master carrier 5 comprises a transparent sheet and an opaque master 3 is mounted on the master carrier 5. The master carrier 5, however, can only be slightly light transmissive (dispersively transmissive) for example, if it comprises light paper, assuming that the information carrying portion 41 of the opaque master 3 is surrounded by a white edge 42. The opaque master 3 has montage edges or shadow edges 43. The upper scanner 14 and the lower scanner 15 are indicated in dashed line and the scanning light beam 7' is also illustrated and it moves in the direction of arrow 13 over the paste-up.

Figure 3B:
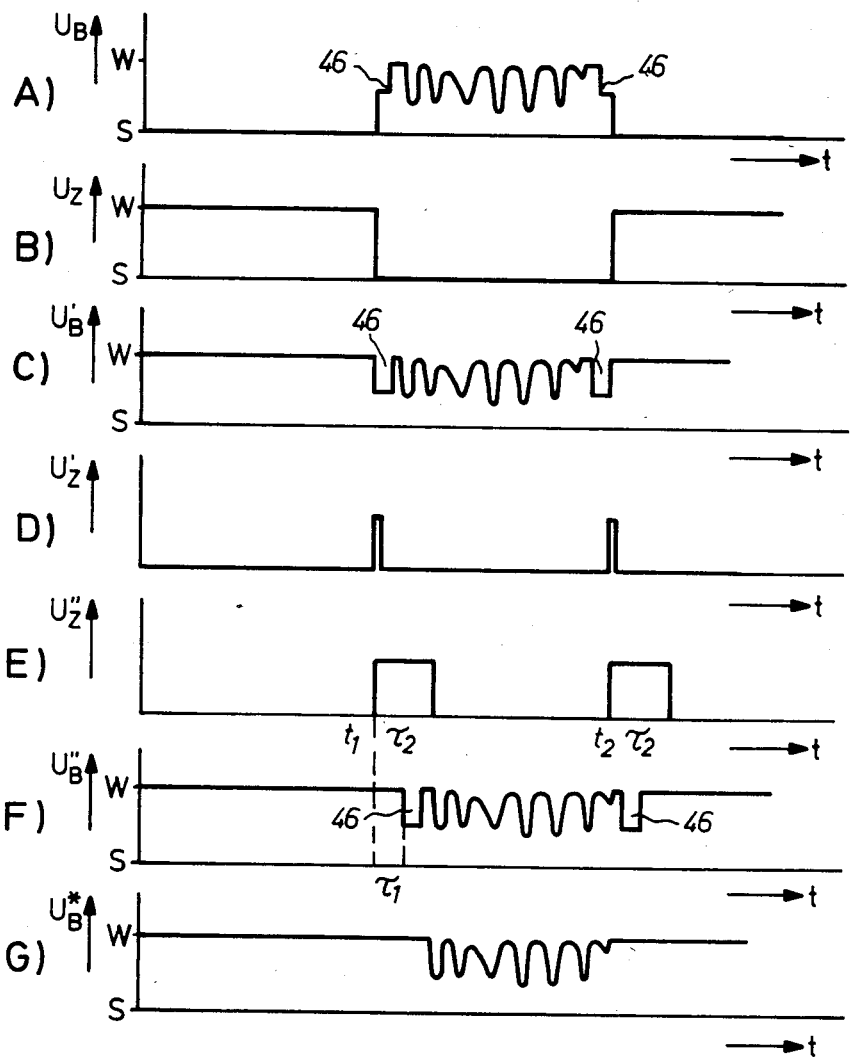

FIGS. 3b-A-G illustrate the signal shapes occurring during the scanning of the paste-up in line direction 13.

In FIG. 3b-A, the image signal $U_B$ obtained from the upper scanner 14, is illustrated and this comprises the actual image information during opaque scanning. The recognition signal $U_Z$ generated by the lower scanner is illustrated in FIG. 3b-B.

FIG. 3b-C illustrates the added results of the image signal $U_B$ and the recognition signal $U_Z$ which occurs in the adder stage 34 of the compensation circuit 18 so as to obtain the modified image signal $U_B'$. At first, in an advantageous manner due to the addition it occurs that the areas 44 and 45 of the master carrier 5 lying outside of the opaque master 3 are reproduced as "white". However, the signal collapses 46 still exists and these would appear as "black" or a shadow during re-recording if not corrected.

FIG. 3b-D illustrates trigger pulses $U_Z'$ generated in the pulse shaping stage 37. These pulses occur when a change from opaque to transparency or vice versa occurs and indicate the potential presence of shadow edges. FIG. 3b-E illustrates the control pulses $U_Z''$ which have the duration of $\tau_2$ which is produced in the one-shot multivibrator 38.

FIG. 3b-F illustrates the image signal $U_B'$ delayed by the time duration $\tau_1$ in the delay stage 35 and the image signal $U_B'$ is supplied to the memory stage 36.

FIG. 3b-G illustrates a plot of the results of the shadow edge suppression with the assistance of the memory stage 36 on the basis of the image signal $U_B^*$ which is utilized for recording. The memory stage 36 retained the image signal values "white" obtained at times $t_1$ and $t_2$ upon occurrences of the shadow edges and retained them for the time $\tau_2$ of the control pulses $U_Z''$ and the signal collapses 46 in the image signal $U_B$ have been eliminated and the shadow edges are suppressed as desired.

Transparency Scanning

During transparency scanning, the change-over switch 39 is moved to the broken line position in FIG. 2 and the upper scanner 14 supplies the auxiliary information and the first scanning signal is the recognition signal $U_Z$. The lower scanner 15 supplies the actual image information and the second scanning signal is the image signal $U_B$. The functioning of the compensation circuit 18 during transparency scanning is explained with reference to the sectional view of FIG. 4a and FIGS. 4b-A through E.

FIG. 4a comprises a sectional view in the line direction through the transparent scanning support 1 and the paste-up 2 mounted thereon. The paste-up 2 FIG. 4a comprises a transparency master 3 which is applied to the transparent master carrier 5. The transparency master 3 may also have a scratch 48 as illustrated.

FIG. 4b-A through E illustrate the signals which occur during transparency scanning of the paste-up in the line direction 13.

The image signal $U_B$ generated in the lower scanner 15 is illustrated in FIG. 4b-A and the recognition signal $U_Z$ obtained in the upper scanner 14 as illustrated in FIG. 4b-B.

When the areas 44 and 45 of the paste-up are scanned the light passes directly through the transparent master carrier to the lower scanner 15 and no scanning light is reflected in the direction toward the upper scanner 14. The image signal $U_B$ will be at the white level and the recognition signal $U_Z$ will be at the black level. As scanning occurs of the information carrying portion 41 of the transparent master 3 only the scanning light which proceeds to the lower scanner 15. When scanning of the shadow edges 42 and the scratch 48 occur, the scanning light is scattered and a small component passes to the lower scanner 15 and in a consequence signal collapses 46 occur in the image signal $U_B$. At the same time, however, scanning light is reflected in the direction of the upper scanner 14 at the shadow edges 42 and at the scratch 48 and the upper scanner 14 converts the received reflected light into voltage pulses 49 to produce the recognition signal $U_Z$.

FIG. 4b-C illustrates the addition of the image signal $U_B$ and the recognition signal $U_Z$ in the adder stage 34 of the compensation circuit 18 so as to obtain the image signal $U_B'$.

It is to be observed that the large signal collapses 46 occurring in the image signal $U_B$ have already been considerably reduced in the image signal $U_B'$ due to the signal addition. The voltage 49 of the recognition signal $U_Z$ is approximately equal to the height of the signal collapses 46 in amplitude and, thus, this collapses 46 can be almost entirely eliminated. In this case, the output signal $U_B'$ of the adder stage 34 could be employed as a corrected image signal $U_B^*$ as indicated in FIG. 2.

So as to achieve a complete shadow edge suppression, the areas 44 and 45 of the master carrier 5 which are not covered with masters can be covered with a white foil. In this case there will occur modified image signal $\overline{U}_B$ and a modified recognition signal $\overline{U}_Z$ which are illustrated in FIGS. 4b-D and FIG. 4b-E which are similar to the curves of FIGS. 3b-A and B for opaque scanning. These signals can be corrected as illustrated in FIGS. 3b for correcting shadow edge suppression using the memory stage 34 in transparency scanning.

When a paste-up is composed of both line work masters (letters, line drawings and so forth) as well as continuous-tone master images there is often a necessity to distinguish the image signal obtained from a line work master from the image signal of a continuous-tone master because, for example, line work masters are reproduced as line work recordings but continuous-tone masters are recorded rastered. In this case, the scanner 14 or the scanner 15 supplying the recognition signal $U_Z$ depending upon whether opaque or transparency scanning occurs can be advantageously employed to generate a recognition signal for "line work" "or continuous-tone". For this purpose, a mark is applied to the master carrier 5, for example, in the line direction 13 in front of the master to be identified and said mark is scanned by the corresponding scanner so as to produce a corresponding recognition signal.

In case the image information of the various masters of the paste-up are to be deposited in separate memory or in separate regions of a single memory, one recognition signal can be advantageously generated for each master with marks being provided with a bar code which is read and evaluated by the scanner. The bar code is also stored and allows localization of the information of the individual masters in the memory.

Figure 5:
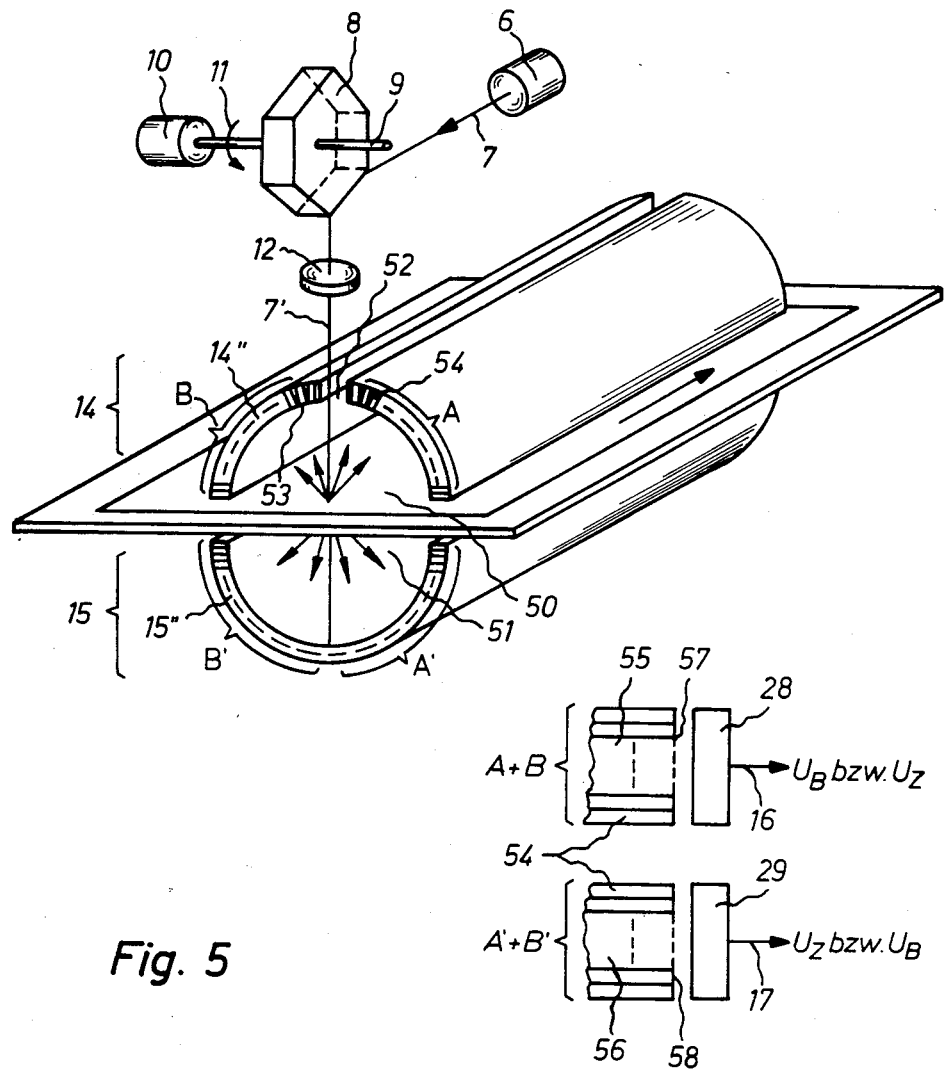
FIG. 5 illustrates a modified version of FIG. 1.

FIG. 5, and FIGS. 5A and 5B illustrate a further sample embodiment of the scanning device in which the scanners 14 and 15 have light pick-up devices 14" and 15" which have been modified relative to FIG. 1.

The light pick-up devices have approximately the shape of half hollow cylinders which have their light openings 50 and 51 facing the scanning table 1. The light pick-up device 14" has a light entry opening 52 for the scanning beam 7'. The entire inside surfaces of the light pick-up devices 14" and 15" are designed as light pick-up surfaces which consist of a multitude of subsurfaces 53. In the sample embodiment, the subsurfaces or the end faces 53 of fiber optical waveguides 54 which are not illustrated in detail or in full length in FIG. 5. The fiber optical waveguides 54 are disposed such that the end faces 53 form approximately tangential surfaces of the hollow half cylinders. All of the fiber optical waveguides 54 are indicated by "A" and "B" and are respectively combined in each light wave pickup to form a fiber optical waveguide bundle 55 or, respectively, 56 (A+B) whereby the other end faces of the optical fiber waveguides 54 together form a respective light exit face 57 or, respectively, 58 for the scanning light. The respective opto-electrical transducers 28, or respectively, 29 may, for example, be in the form of fast photomultipliers which generate the image signal $U_B$ B or, respectively, the recognition signal $U_Z$ on lines 16 or 17 and are optically coupled to the light emerging faces 57 or, respectively, 58 as illustrated in FIGS. 5A and 5B. Alternatively, the subsurfaces 53 can also be the light entry surfaces of photodiodes.

The embodiments of the scanning devices described or related to flat bed scanning and are designed such that the light pick-up devices extend at least over the length of the scanning support illustrated in FIGS. 1 and 5.

The scanning devices, however, can also be utilized in drum scanning devices. For this case, the light pick-up devices 14', 15' or, respectively 14", 15' or respectively 14", 15", for example, are designed as a hollow sphere or, respectively, as a part of a hollow sphere which has the cross-sections illustrated in FIGS. 1 and 5. The light pick-up surfaces 22 and 23 are not designed slit-like but rather are circular or quadratic in shape. The cross-sectional transducers 24 and 25 are eliminated and the opto-electronic transducers 28 and 29 are directly mounted in the circular or quadratic light pick-up surfaces or are connected over at least one fiber optical waveguide. With such drum scanning devices, the one light pick-up device is situated within and the other light pick-up device is situated outside the scanning drum and the scanning drum is transparent. The overall scanning device then moves axially passed the scanning drum together with the scanning light beams.

The scanning devices of course can also be used for scanning chromatic paste-ups. In this case, three respective cross-sectional transducers 24 and 25 are provided assuming the embodiment of the light pick-up devices 14' and 15' illustrated in FIG. 1, and the overall light entry surfaces of the cross-sectional transducers 24 and 25 form the light pick-up surfaces 22 and 23 of the light pick-up devices. For the purpose of color separation of the scanning light, the light exit surfaces of the cross-sectional transducers in contrast are separately coupled through three color dividers to three separate opto-electronic transducers which generate the three measured color value signals.

With the embodiment of the light pick-up devices 14, 15 illustrated in FIG. 5, the fiber optical waveguide bundle conducted to the opto-electronic transducers is split into at least three individual bundles wherein the end faces of the fiber optical waveguides of an individual bundle form a respective separate light exit surface. The division of the fiber optical waveguide bundle occurs in a manner such that respectively one triplet or triad of fiber optical waveguides which have their end faces lying tightly adjacent to each other in the light pick-up surface is selected in each fiber waveguide for each triplet or triad is allocated to an individual bundle. For the purpose of color separation of the scanning light, the three light exit surfaces are likewise coupled over a three color dividers to three separate opto-electronic transducers so as to generate the three measured color value signals.

Figure 6:
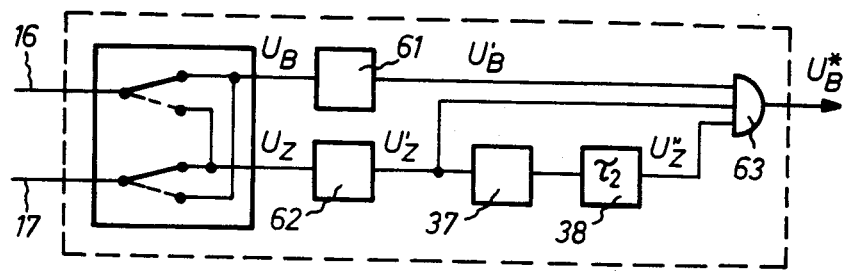
FIG. 6 comprises a block diagram of a second embodiment of a compensation circuit.

FIG. 6 illustrates a further sample embodiment of a compensation circuit 18' which can be employed for a line work paste-ups. A pair of level stages 61 and 62 produce image signals $U_B'$ and recognition signals $U_Z'$ which have maximum amplitudes which correspond to the white level and have minimum amplitudes which correspond to the black level. The two level signals $U_Z'$ is reshaped in the pulse shaping stage 37 into a trigger pulse which is supplied to the multivibrator 38 which generates a voltage pulse $U_Z''$ having a pulse duration of $\tau_2$. The two level signals $U_B'$ and $U_Z'$ as well as the voltage pulse $U_Z''$ pass to an OR gate 63 which produces an output signal comprising the corrected image signal $U_B^*$.

Figure 7:
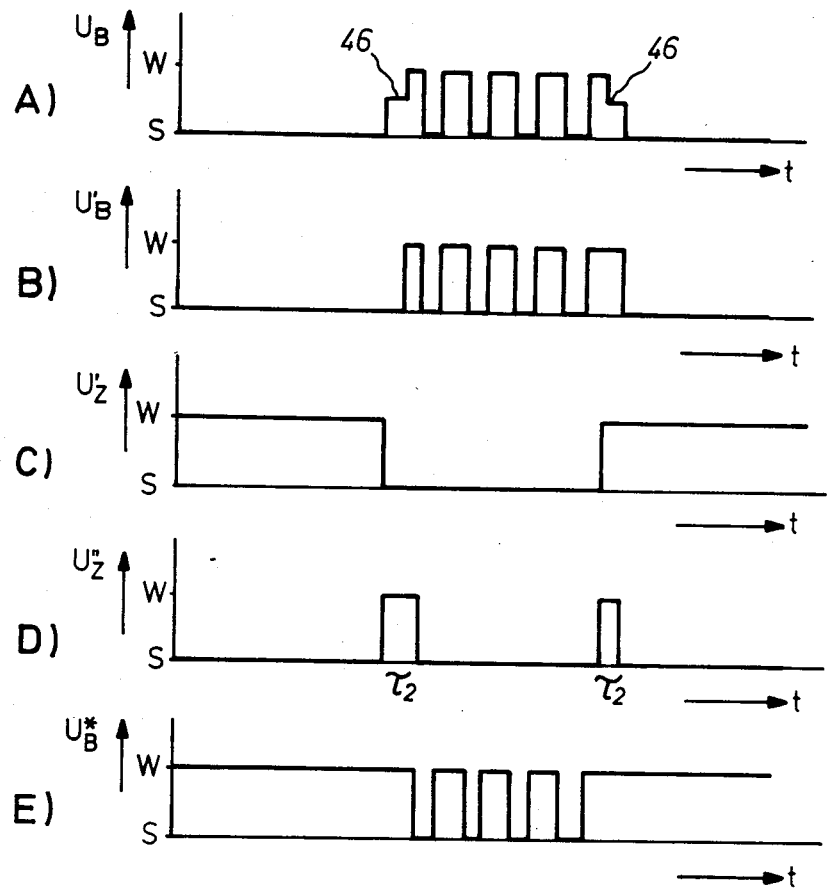
FIG. 7A-E comprise plots for explaining the invention.

FIGS. 7A through 7E comprise graphic illustrations for explaining the functioning of the compensation circuit 18′ when opaque scanning occurs. FIG. 7A is a plot of the image signal $U_B$ and shows the signal collapses 46 due to the shadow edges. FIG. 7B shows the two level image signal $U_B'$ and FIG. 7C illustrates the two level recognition signal $U_Z'$ at the outputs of the level stages 61 and 62 respectively. The voltage $U_Z''$ which has the pulse duration $\tau_2$ is indicated in FIG. 7D. FIG. 7E illustrates the corrected image signal $U_B^*$ which occurs at the output of the OR gate 63. It is to be observed that the signal collapses 46 in the image signal $U_B$ have been eliminated by the circuit of FIG. 6.

Although the invention has been described with respect to preferred embodiments it is not to be so limited as changes and modifications may be made therein which are within the full intended scope of the invention as defined by the appended claims.

We claim as our invention:

1. The method for point-wise and line-wise, opto-electronic scanning of masters which are disposed on a transparent master carrier, comprising the steps of
   (a) simultaneously scanning the same point of the master by means of opaque and transparency scanning, to obtain a first scanning signal which is the actual image signal ($U_B$) for the master and a second scanning signal which is a recognition signal ($U_Z$) for those points of the masters at which amplitude errors occur in the image signal due to scattered light and/or shadowings; and
   (b) eliminating the amplitude errors in said actual image signal with the recognition signal.

2. The method according to claim 1, wherein the image signal and the recognition signal are added in order to eliminate the amplitude errors.

3. The method according to claim 1, characterized in that the respective amplitude value of the image signal existing before the occurrence of a recognition signal is held at least for the duration of the amplitude error.

4. The method according to claim 1, characterized in that:
   (a) said image signal and said recognition signal are added together; and
   b) the respective amplitude value of the sum signal existing before occurrence of a recognition signal is held at least for the duration of the amplitude error.

5. The method for point-wise and linewise, opto-electronic scanning of masters which are disposed on a transparent master carrier, comprising the steps of
   (a) simultaneously scanning the same point of the master by means of opaque and transparency scanning, to obtain a first scanning signal which is the actual image signal ($U_B$) for the master and a second scanning signal which is a recognition signal ($U_Z$) for those points of the masters at which amplitude errors occur in the image signal due to scattered light and/or shadowings;
   (b) eliminating the amplitude errors in said actual image signal with the recognition signal;
   (c) forming a digital voltage pulse from the digitized recognition signal with said digital voltage pulse haivng at least the duration of an amplitude error; and
   (d) subjecting the digitized recognition signal, the digitized image signal and digital voltage pulse to an inclusive-OR operation for the elimination of the amplitude errors.

6. A scanning device for point-wise and line-wise opto-electronic scanning of masters which are disposed on a transparent master carrier, comprising:
   (a) a first opto-electronic scanner (14) for generating a first scanning signal by means of opaque scanning, and said first scanner being disposed on the side of the master carrier (5) facing the scanning light beam;
   (b) a second opto-electronic scanner (15) for generating a second scanning signal by means of transparency scanning, and said second opto-electronic scanner being disposed on the side of the master carrier (5) facing away from the scanning light beam, whereby one of the scanning signals is the actual image signal of the masters and the other scanning signal is a recognition signal for those points of the masters at which amplitude errors in the image signal occur due to scatter light and/or shadowings; and
   (c) a compensation circuit (18) receiving the outputs of said first and second scanners (14, 15) and eliminating amplitude errors in the image signal.

7. A scanning arrangement according to claim 6, comprising an adder stage (34) in said compensation stage (18) for generating a sum signal by adding said image signal and said recognition signal.

8. A scanning device according to claim 7, comprising:
   (a) a delay stage (35) in said compensation circuit (18) which is connected to the adder stage (34), for the purpose of delaying the sum signals,
   (b) a controllable memory stage (36) in said compensation circuit (18) for storing amplitude values of the sum signal, and connected to the delay stage (35); and
   (c) a pulse shaper (37, 38) in said compensation circuit (18) receiving the recognition signal for generating pulses having an adjustable duration from the recognition signal, said pulse shaper connected to the control input of said memory stage (36), and the memory stage (36) retaining the amplitude value of the sum signal existing before said recognition signal and retaining it for the duration of the pulse.

9. A scanning device according to claim 8, wherein said memory stage (36) is designed as a sample-and-hold circuit.

10. A scanning device for line work masters according to claim 6 wherein said compensation circuit (18) includes:
    (a) a pulse shaper (37, 38) which receives the digitized recognition signal for the purpose of generating pulses having an adjustable duration; and
    (b) an OR gate (63) for the elimination of the amplitude errors, said OR gate receiving the digitized image signal, the digitized recognition signal, and the pulses having an adjustable duration.

11. A scanning device according to claim 6, wherein said first and second scanners (14, 15 or, respectively, 14′, 15′) are designed as light-collecting devices for the scanning light and have the form of reflecting hollow bodies and include opto-electronic transducers (28, 29) for generating the scanning signals.

12. A scanning device according to claim 11, wherein:
    (a) said hollow bodies have an opening (22 or, respectively 23) serving as a light pick-up surface and have a light entry opening (20, or, respectively, 21) for the light used in scanning coming from the masters;

(b) the inside surface of the hollow bodies opposite the light pick-up surface (22 or, respectively, 23) designed as diffusively reflecting, first reflectors (30 or, respectively 31) at least in an area within the acceptance angle of the light pick-up surface (22 or, respectively, 23) and the inside surface adjacent to the light pick-up surface (22 or, respectively 23) designed as a second reflector (32 or, respectively, 33); whereby (c) the reflectors are disposed relative to one another such that the incident light is respectively conducted to the reflector lying opposite;

(d) the first reflector (30 or, respectively, 31) is shaped and aligned relative to the light pick-up surface (22 or, respectively, 23) such that a large component of the scattered light impinges upon the light pick-up surface (22 or, respectively, 23);and (e) the light entry opening (20 or, respectively, 21) is designed and aligned relative to the light pick-up surface (22 or, respectively, 23) such that the scanning light does not impinge directly upon the light pick-up surface but, rather, is diffusely reflected at least once by the reflector (30, or, respectively, 31).

13. A scanning device according to claim 12, wherein the hollow body additionally has a light entry opening (19) for the scanning light beam (7') during opaque scanning.

14. A scanning device according to claim 12, characterized in that the second reflector (22 or, respectively, 23) is designed as a diffuse reflector.

15. A scanning device according to claim 12, wherein the second reflector (22 or, respectively, 23) is designed as a mirror.

16. A scanning device according to claim 11, wherein the light pick-up surface (22 or, respectively, 23) is formed by an end face of an optical cross-sectional transducer (24 or, respectively, 25) and to its other end face the opto-electronic transducer (28 or, respectively 29) is coupled.

17. A scanning device according to claim 11, wherein:

(a) the hollow body has a light entry opening (50, or respectively 52) for the scanning light arriving from the masters; and (b) the inner surface of the hollow body is designed as a light pick-up surface (53).

18. A scanning device according to claim 17, wherein:

(a) the light pick-up surface (53) is formed by the end faces of a multitude of fiber optical waveguides (54), and the surfaces normal to said end faces are aligned in the direction of the in-coming scanning light; and (b) the other end faces (57) of the fiber optical waveguides (54) are coupled to the opto-electronic transducers (28 or, respectively, 29).

19. A scanning device according to claim 11, wherein the hollow body is designed as a hollow cylinder or, respectively as a part of a hollow cylinder for scanning planar master carriers.

20. A scanning device according to claim 11, wherein the hollow body is designed as a hollow sphere or, respectively, as part of a hollow sphere for scanning drum-shaped scanning supports.

* * * * *